United States Patent [19]

Zeltner et al.

[11] 4,271,630
[45] Jun. 9, 1981

[54] SOIL SUPPORTS FOR PLANT CONTAINERS

[75] Inventors: Bernard Zeltner, Aix en Provence; Gaston Marmonnier, Marseilles, both of France

[73] Assignee: Manufacture Provencale de Matieres Plastiques SA, Marseille, France

[21] Appl. No.: 51,725

[22] Filed: Jun. 25, 1979

[51] Int. Cl.³ .................................................. A01G 27/00
[52] U.S. Cl. ........................................... 47/81; 47/66; 428/255
[58] Field of Search ................................... 47/79–82, 47/64, 66, 71; 428/163, 167, 255

[56] References Cited

U.S. PATENT DOCUMENTS

| | | | |
|---|---|---|---|
| 3,106,043 | 10/1963 | Ferrand | 47/81 |
| 3,266,966 | 8/1966 | Patchell | 428/255 X |
| 3,482,567 | 12/1969 | Franklin | 428/255 X |
| 3,576,088 | 4/1971 | Arca | 47/81 |
| 3,762,984 | 10/1973 | Goldbeck | 428/255 X |
| 4,101,359 | 7/1978 | Failliot | 428/255 X |

FOREIGN PATENT DOCUMENTS

1264832 5/1961 France .................................. 47/81

Primary Examiner—Robert E. Bagwill
Attorney, Agent, or Firm—Stevens, Davis, Miller & Mosher

[57] ABSTRACT

Method of making a soil support for a plant container having a water reservoir beneath the support. The support is made by providing a fabric of water-absorbent fabric which is carried by support members. To hold the fabric in place, at least one fabric region is deformed and held in deformed state by a support member. In a preferred arrangement at least two spaced regions are deformed so as to stretch and tension the fabric between these regions and the regions are retained in deformed state by the support members and maintain the tension. In practice, support members are made by plastics injection moulding. The injection pressure deforms fabric extending across mould cavities and the plastics hardens to retain the deformed shape.

6 Claims, 19 Drawing Figures

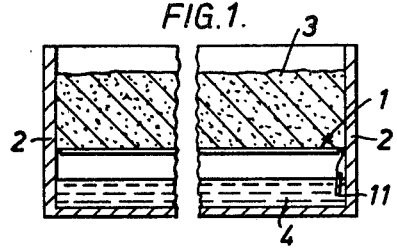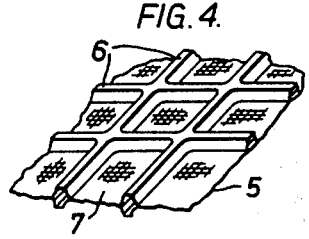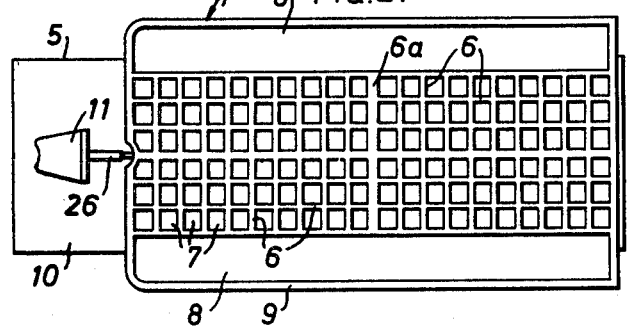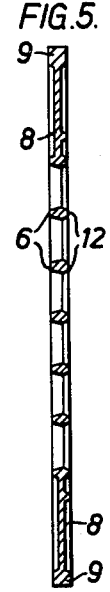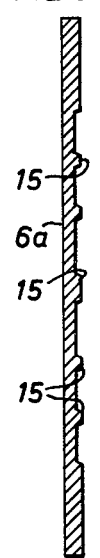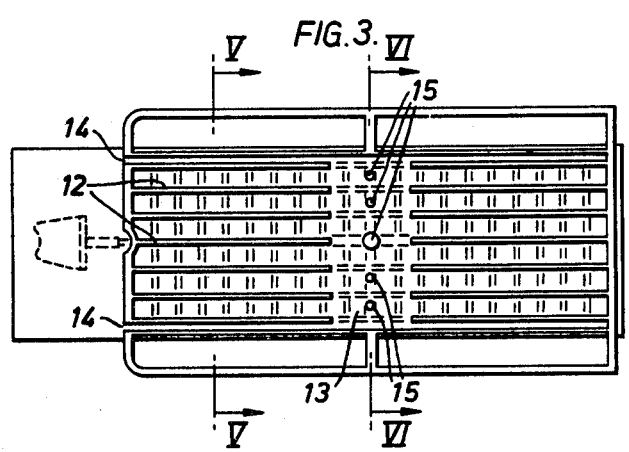

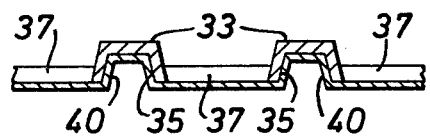
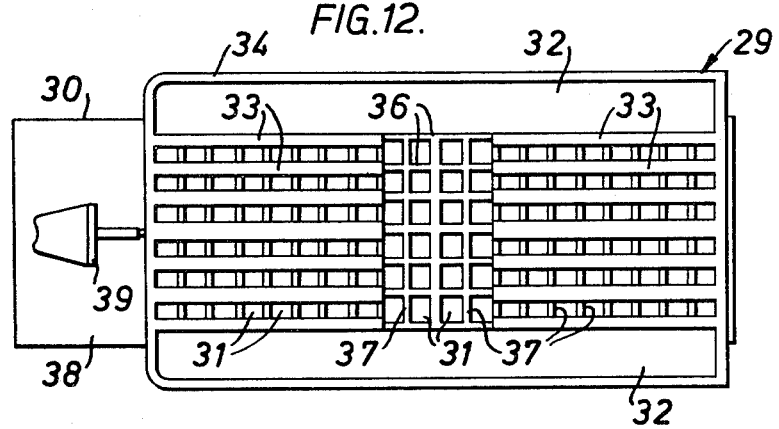
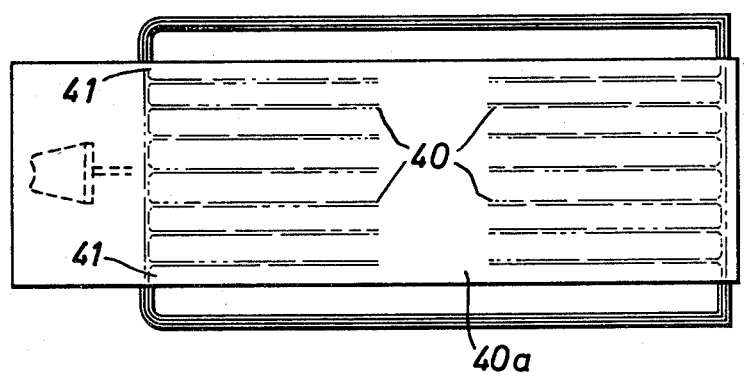

U.S. Patent Jun. 9, 1981 Sheet 4 of 4 4,271,630
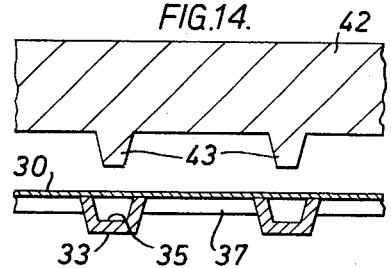
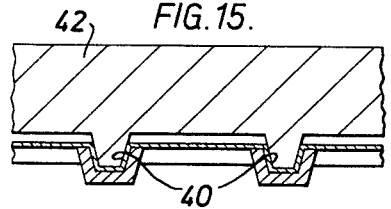
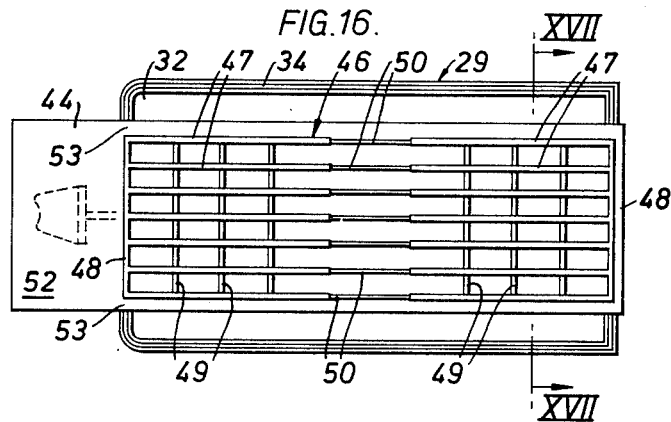
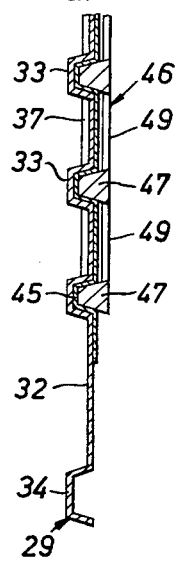
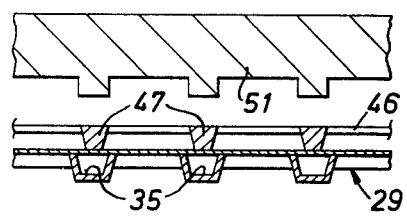
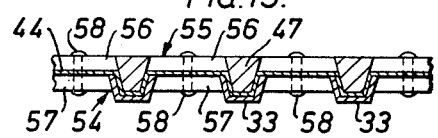

SOIL SUPPORTS FOR PLANT CONTAINERS

This invention relates to soil supports for plant containers and to methods of their manufacture.

Plant containers are known which have a reservoir for water disposed above which is a soil support for supporting material such as particulate or humus materials which may be used for holding roots of plants. Materials for this purpose will be referred to throughout this specification as "soil."

Suggestions have been made for the provision within or upon said supports of a water absorbent fabric which contacts the soil and has a portion which hangs into water contained within the reservoir for the purpose of raising the water from the reservoir and into the soil by the absorbent action of the fabric. With this arrangement, the need for constant rewatering of plants is avoided and with the use of a filled reservoir, a plant requires little or no attention for long periods of time.

To assist in the transfer of water to the soil, supports have been described which have openings through them so that parts of the fabric extending across these openings are in contact with and support the soil while facing downwardly into the reservoirs of their containers. With this arrangement, moisture is transferred to the fabric also by evaporation from the surface of the water in its reservoir and condensation upon the underside of the fabric. Clearly for water transfer to be fully effective by the evaporation and condensation process, then the openings in the supports need to be as large as possible together with the requirement that the fabric extending across the openings is sufficiently strong to support the weight of the soil and preferably will not be caused to sag in the regions of the openings under this weight.

Accordingly, one aspect of the present invention provides a method of making a soil support for a plant container in which the support has a plurality of fabric support members defining openings between them and a layer of substantially inextensible, water absorbent fabric extending across the openings in planar manner, the method comprising causing deformation of the fabric out of its plane in at least one region of the fabric and securing the deformed region to a support member to retain said region in its deformed state.

By the use of the above method, the fabric is secured in at least one region, that is, the deformed region. This prevents relative movement of fabric and the support member to which the deformed region is secured.

The method of the invention is preferably performed by holding the layer of fabric within an open injection mould, closing the mould to hold the fabric facing across the flow path of thermoplastics material to be injected into a mould cavity for moulding the support member, and injecting the thermoplastics material into the mould to form the support member. The pressure of the material being injected forces the region of fabric which lies adjacent the cavity, into the cavity so as to deform said region, the thermoplastics material, after cooling, retaining the region in its deformed condition.

By the injection method of making support members, some of the injected material may flow through interstices in the fabric so that parts of the region are embedded in the support member.

In a preferred method, deformation of the fabric is caused in at least two spaced-apart regions by the application of pressure to the fabric to place the fabric in tension between the two regions. The two regions are secured to two spaced-apart support members, one region to each member, and the members are retained spaced-apart to hold the fabric in tension.

Holding the fabric between two deformed regions in tension resists any tendency for the fabric to sag under the weight of soil even when the openings defined between the support members are of substantial size, e.g. of the order of around 15 mm square or larger, such as a rectangular shape with proportions of 15 mm and 25 mm for the minimum and maximum dimensions.

In an alternative way of performing the inventive method, the fabric is deformed into contact with and held against non-planar surface parts of support members. Welding techniques or adhesives may be used to hold the deformed regions of fabric in place.

Secondary support members may also be used to sandwich the deformed regions of fabric against the first mentioned support members and either welding techniques or mechanical locking means may be used to retain support members on fabric in an assembly.

The invention also includes a soil support with a substantially inextensible water absorbent fabric extending in planar manner across openings between support members, and with at least one region of fabric being held in a condition deformed from the plane of the fabric by a support member.

Embodiments of the invention will now be described, by way of example, with reference to the accompanying drawings, in which:

FIG. 1 is a cross-sectional side view of a plant container having a soil support according to a first embodiment;

FIG. 2 is a plan view of the soil support of FIG. 1;

FIG. 3 is an underside plan view of the soil support of FIG. 1;

FIG. 4 is an isometric view of a detail of the soil support of FIG. 1 and on a larger scale;

FIG. 5 is a cross-sectional view of the soil support taken along line 'V—V' in FIG. 3 and on a larger scale than FIG. 3;

FIG. 6 is a view similar to FIG. 5 but taken along line 'VI—VI' in FIG. 3;

FIG. 11 is a lateral cross-sectional view of part of a soil support according to a second embodiment and on enlarged scale;

FIG. 12 is a plan view of the support of FIG. 11 and on a smaller scale;

FIG. 13 is an underside plan view of the support of the second embodiment;

FIGS. 14 and 15 are lateral cross-sectional views on the scale of FIG. 11 showing two different stages in the manufacture of the support of the second embodiment;

FIG. 16 is an underside plan view of a soil support according to a third embodiment;

FIG. 17 is a cross-sectional view along line 'XVII—XVII' in FIG. 16 of part of the soil support and on a larger scale;

FIG. 18 is a lateral cross-sectional view of parts of the elements of the support of the third embodiment and on the same scale as FIG. 17, showing one stage in its manufacture; and FIG. 19 is a view similar to FIG. 17 of a fourth embodiment.

Figure 8:
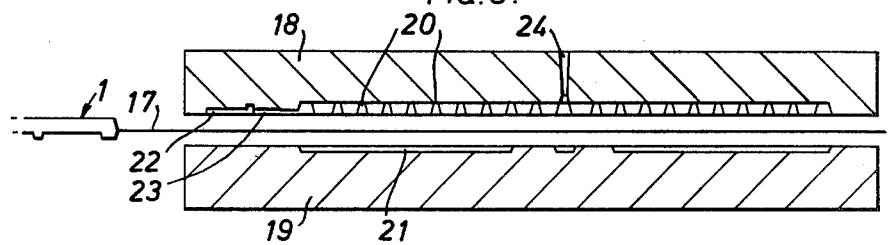
FIG. 8 is a diagrammatic side elevational view, in cross-section, of part of injection moulding machine showing a first stage in the manufacture of the soil support of the first embodiment.

In a first embodiment, as shown in FIG. 1, a soil support 1 is held between sides 2 of a plant container for supporting plant-containing soil 3 from a lower water reservoir 4.

The soil support, as shown in FIG. 2, is of rectangular plan to fit between the container sides 2. The support comprises a layer of substantially inextensible water-absorbent woven fabric 5 made from nylon filament. This layer is held generally in substantially planar configuration by a fabric support structure comprising injection moulded support members 6 which are in the form of bars and extend upwardly from the layer and lie both longitudinally and laterally of the support. The longitudinal bars merge with the lateral bars at crossing positions to form rectangular cells or openings 7 between them, the openings having maximum and minimum dimensions of 25 mm and 15 mm (approximately 1 inch×0.6 inches). As shown in FIG. 4, the bars which have a height of about 4 to 6 mm (0.25 inches) have tapered sides to allow for their removal from a mould.

Along each longitudinal edge of the layer of fabric, the support is in the form of a narrow planar frame 8 of plastic which overlies and extends beyond the edges of the fabric (FIGS. 5 and 6) to terminate in a thicker marginal bead 9 which extends in continuous fashion around the upper side of the support.

The layer of fabric extends outwardly from one end of the rectangular support to provide a flexible extension 10 having a thermoplastics moulded weight 11 on one side of it. When the support is fitted into the container, the extension is folded downwards at the frame 8 so as to hang into the water reservoir whereby water is raised into the support and from there into the soil by capillary action in the fabric. The weight 11 ensures that the extension 10 does extend into the water.

On the underside of the support (FIG. 3), certain of the longitudinal support members project below the plane of the fabric layer (see also FIGS. 5, 6 and 7) to provide lower portions 12 of the support members. The portions 12 extend from the bead 9 at the two ends of the support and are interrupted in a central region 13 of the support. The bead 9 projects downwardly below the plane of the fabric layer and is substantially continuous on the underside of the support except for two regions at the end of the support having the extension 10 in which two narrow gaps 14 are formed in the bead adjacent the longitudinal edges of the fabric. As will be described, because of the manner in which the support is made, water being fed by capillary action up the extension 10 cannot pass along the fabric extending through the bead 9, nor is it possible for water to pass along parts of the fabric extending through the supports 6 when the supports project below the plane of the fabric to form the lower portions 12. Hence, the movement of water in the fabric layer is controlled so as to flow from extension 10 only through the gaps 14 in order to reach the fabric regions held within the rectangular confines of the support. The water may only flow from gaps 14 along the narrow edges of fabric to the central region 13 of the support when it is possible for it to flow laterally inwardly across the fabric between the lower portions 12 and then longitudinally of the fabric between side-by-side lower portions 12 and towards the ends of the support. The support with its arrangement of support members 6, frame 9, and lower portions 12 of the support members is constructed and operates to control water flow in the manner described and claimed in a patent application filed concurrently herewith, applicants Bernard Zeltner et al, and entitled "Water-Distributing Soil Support for Plant Containers."

In addition to the lower portions 12, a plurality of spaced boss-shaped projections 15 extend downwardly beneath the plane of the fabric layer from a centrally disposed laterally extending support member 6a and these projections lie in the central region 13 of the support.

Figure 7:
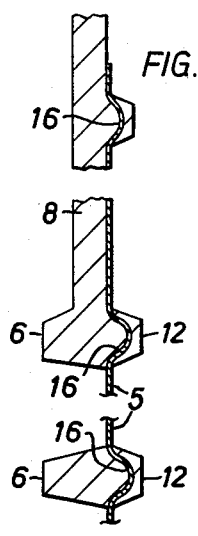
FIG. 7 is a cross-sectional view of one side region of the soil support of FIG. 1 and on a greatly enlarged scale.

As may be seen from FIG. 7, although the lower portions 12 of the support members extend below the plane of the fabric layer, the layer does not extend in planar fashion through the mass of thermoplastics material which forms the support members 6 but is deformed downwardly in the regions 16 within each lower portion 12. The support members 6 hold the deformed regions in their deformed state so as to provide an extremely effective securing arrangement of the fabric layer so as to prevent its slippage under weight of soil in the container. The retention of the deformed regions 16 in position is also assisted by the fact that thermoplastics material of the support members extends through and fills interstices in the fabric layer so as to lock each thread of fabric in the deformed regions. As will be described below, the method of making the support causes a tensile force to be applied in the layer between adjacent support members whereby the layer is held taut between its deformed regions. Although not shown in the drawings, the fabric layer is also deformed downwardly within the boss-shaped projections 15.

Figure 9:
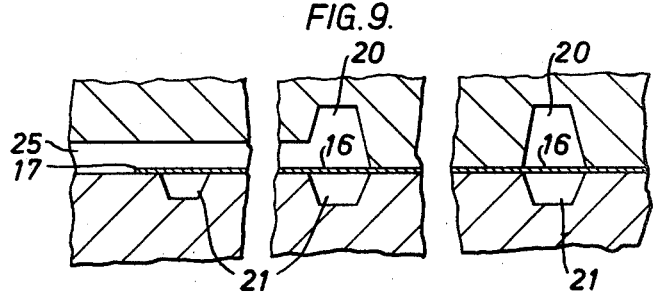
FIGS. 9 and 10 are lateral cross-sectional scrap views, on the same scale as FIG. 7 showing further stages in the manufacture of the support.
Figure 10:
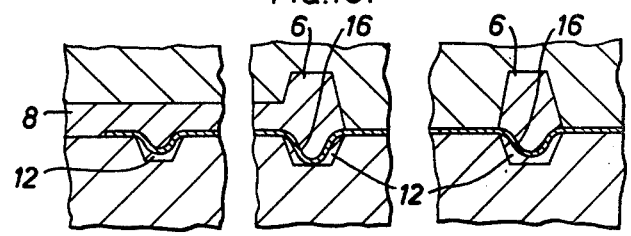

The soil support is formed as one of a succession of similarly constructed and shaped supports by a process using an injection moulding machine as shown in FIGS. 8, 9 and 10. As shown in FIG. 8, an indefinite length 17 of fabric is fed with intermittent motion between mould halves 18 and 19. The mould half 18 has interconnected mould cavities 20 for moulding the support members 6 and mould half 19 has cavities 21 for moulding the lower portions 12 of the support members 6. The cavities 21 are aligned with longitudinal cavities 20 and are spaced laterally of the path of movement of the fabric layer. As shown in FIG. 8, one end of the mould half 18 is formed with a cavity 22 for moulding the weight 11, the cavity 22 being connected with the cavities 20 by a runner 23.

In use, with the moulding machine open as shown in FIG. 8, the length 17 of fabric is moved a controlled distance through the machine to remove from the mould a soil support 1 which has just been made to feed it forward for a severing operation to remove it from the length 17. A succeeding part of the length 17 for making the fabric layer 5 is then disposed in position between the mould halves.

Upon closing the mould (FIG. 9), the length 17 lying between the mould halves is in planar condition and separates cavities 20 from cavities 21 with which they are aligned. The thermoplastics material for moulding the frame 8, bead 9 and support members 6 is then injected through a sprue 24 (FIG. 8) and flows along the cavities 20 to extreme cavity areas 25 (FIG. 9) for moulding the planar frame 8 while passing partly through interstices of the fabric facing onto these cavities. The thermoplastics material is not free to flow directly into cavities 21 because the length 17 of fabric extends across the flow path. Hence, the force created by the forward movement of the injected material under the injection pressure, stretches the regions 16 of the fabric in front of it, out of the plane of the fabric so that these regions become deformed. This stretching and deformation procedure places a tensile force in a transverse direction in the fabric lying between the cavities 21; the support members together with their lower portions 12, hold the deformed regions in their deformed conditions after cooling of the thermoplastic material. As the support members and portions 12 cannot move relative to one another in the total structure, the fabric between adjacent deformed regions 16 is maintained in tension.

In the finished construction as shown in FIG. 10, fabric in parts of deformed regions 16 may be stretched to contact mould surfaces of the cavities 21 so as to be visible at surfaces of the lower portions 12 of the support members in the finished structure. In other instances, thermoplastics material passes through interstices in the deformed regions of the fabric so that parts of at least some deformed regions are completely embedded in the lower portions 12 of the members 6.

After the severing of each soil support from the length 17 of fabric, the runner material 26 (FIG. 2) connecting the weight 11 with the moulded structure is easily broken manually to permit the flexible extension 10 of the support to be folded down together with its weight to assume its working position shown in FIG. 1.

In the above embodiment, the support structure is injection moulded from a material having an injection moulding temperature below a temperature at which the material of the fabric layer is degradable by melting or softening. In this embodiment, the fabric layer is nylon while the support structure is made from polystyrene.

In use of the soil support in the plant container of FIG. 1, a plant has its roots embedded in the soil 3 which is carried by the soil support. Most of the weight of the soil is taken into the fabric layer 5 in the regions of the openings 7. The layer 5 is prevented from sagging by the lower portions 12 of the support members stopping slippage of the deformed regions 16 of fabric and maintaining the tension in the fabric between the support members. Thus, a firm and substantially stable support is provided for the soil.

In addition, because the deformed regions 16 of the fabric layer are embedded in the thermoplastics material which blocks the interstices in these regions, water may flow only along pathways defined between the lower portions 12 of the support members and is controlled in the manner described above in this embodiment.

In the above construction, the support members 6 and 6a extend upwardly from the fabric layer 5 and provide discrete cells or openings 7 and thus separate the soil in one cell from that in adjacent cells or openings. This soil separation reduces the tendency of the soil at the lower portions thereof from forming a single hardened mass which could resist the upward percolation of water from the fabric layer to the plant roots. Thus, the method of forming the soil support described in this embodiment allows for the provision of the upwardly standing support members while providing a means for holding the fabric layer securely in place.

In a second embodiment shown in FIGS. 11, 12 and 13, a soil support comprises a rigid rectangular fabric support structure 29 formed from laterally and longitudinally extending support members which extend upwardly from a layer 30 of fabric to form cells 31. The lateral edges of the support member structure are joined to planar frames 32, similar to the frames 8 in the first embodiment.

The longitudinal support members 33 extend in side-by-side parallel relationship from the two ends of the structure and are joined to a marginal continuous bead 34. Each support member 33 is formed on its underside with a non-planar surface in that the member is of inverted U-shape in lateral cross-section in operating position (FIG. 11 shows part of the structure). The non-planar surface defines the sides of a groove 35 extending longitudinally in each support member 33. The bead 34 is of similarly shaped cross-section with its groove being interconnected with that of each support member 33. Each support member 33 is longitudinally aligned with another member 33 extending from the other end of the structure. Aligned support members are joined together by shallower, ungrooved support members 36.

The lateral support members 37, of shape and size similar to members 36, join side-by-side members 33 and side-by-side members 36 to complete the cell structure.

The layer 30 of fabric which is of the same structure as that of the first embodiment extends longitudinally beneath the structure 29 and has a flexible extension 38 with a moulded weight 39. The layer 30 has regions 40 (FIG. 13) which are deformed upwardly into the grooves 35 and the thermoplastic material of the support members 33 and of the bead 34 forming the surfaces of the grooves is fused to the fabric to hold the regions 40 in their deformed state. The bead at two positions adjacent the side edges of the layer of fabric near the extension 38 is devoid of a groove so that the fabric at these edge positions 41 (FIG. 13) is not deformed nor is it fused to the bead. The fabric other than at the deformed regions 40 is in a substantially planar condition and is held in tension between the deformed regions as it extends beneath the cells 31.

To make the soil support of the second embodiment, the rigid fabric support structure of support members and edge frame is preformed by injection moulding. The inverted soil support is then overlaid by the layer 30 of fabric and beneath a tool 42 (FIG. 14) for fusing the fabric and surfaces of the U-shaped channels together by welding. The tool 42 is a high frequency or ultrasonic welding tool but may also be a heated tool for softening and melting the materials of the fabric and support members by heat. The tool has a lower surface formed with ribs 43 in a shape substantially complementary to the shape of the grooves 35. To weld the fabric and support members together, the tool is lowered to insert the ribs into the grooves 35 as shown in FIG. 15. As the tool descends, it deforms the fabric into the grooves until these deformed regions mutually contact the surfaces of the grooves of the members 33 and of the bead 34. This deformation procedure causes stretching and tensioning of the fabric across the cells 33. It is advisable to have the ribs 43 sufficiently high to provide a gap between the tool and the fabric across cells 33 when the tool is firmly seated within the channels as shown in FIG. 15. The welding operation then takes place in a manner known to skilled persons in the thermoplastics art, and the tool is then removed while leaving fabric and support members firmly welded together.

In the second embodiment, sagging of the fabric is again prevented because of tension in and firm holding of the fabric. Also, as the welding process either destroys or fills the interstices in the fabric in the deformed regions, water cannot flow by capillary action from one side of a support member to another. Hence, water is controlled to flow along the fabric at positions 41 only, then along its edges until it reaches a position halfway between ends of the structure. From here, the water flows laterally through the gap 44 between longitudinally aligned deformed regions 40a and then towards ends of the structure between regions 40.

In a modification of the second embodiment (not shown), a soil support is of exactly the same structure as in the second embodiment except that the deformed regions 40 of the fabric are not held within the grooves by welding. In the modification, glue is applied to the surfaces defining the grooves and the deformed regions 40 are held against these surfaces and are permanently secured thereto by a tool formed with ribs of similar construction to the tool 42 in the second embodiment.

In a third embodiment, shown in FIGS. 16 and 17, a soil support comprises a fabric support structure 29 of the same construction as the structure 29 in the second embodiment with a plan view identical to that of FIG. 12. Like references will be used for the parts of structure 29 described in the second embodiment.

The structure 29 of the third embodiment supports a layer 44 of fabric of the same construction as that described in the other embodiments. The layer 44 is held against the support structure 29 with deformed regions 45 of the fabric within the grooves 35 by a secondary support structure 46. This support structure 46 is of sufficient size only to cover the area occupied by the grooves 35 in the support members 33 and the bead 34 underlying the layer 44. The support structure 46 is formed by injection moulding and comprises two sets of bars 47, the bars in each set lying side-by-side and in parallel relationship with each bar being integrally formed at one end with a main lateral bar 48. Subsidiary bars 49 extend between side-by-side bars 47 to maintain their lateral setting. The two sets of bars are joined by subsidiary longitudinal bars 50 which extend between longitudinally aligned bars of the two sets.

The bars 47 and 48 are tapered in cross-section complementary to the grooves 35 (FIG. 17) and are relatively disposed so as to fit into the grooves 35 and sandwich the deformed regions 45 of the layer 44 between the support members 33 and bead 34 on the one hand, and the bars 47 and 48 on the other. The subsidiary bars 49 and 50 are of smaller cross-sectional area than the bars 47 and 48 and are not held closely against the fabric layer as may be seen from FIG. 17. The deformed regions 45 of layer 44 are secured to the surfaces of grooves 35 and to the bars 47 by welding together of the thermoplastics material of the bars 47 and support members 33 with accompanying flow of thermoplastics material through the interstices in the fabric.

The soil support of the third embodiment is assembled by superposing the structures 29 and 46 with the layer of fabric between them and beneath a high frequency, ultrasonic or heating tool 51 as shown in FIG. 18. The tool is then lowered to force the bars 47 into the grooves 35 while deforming the regions 45. The tool is then activated to cause a welding operation to take place.

In the completed soil support, water is controlled to flow from a flexible end 52 through edge regions 53 (FIG. 16) not occupied by bars 47 and 48 and from thence along opposite edges of the layer 44 until it reaches the bars 50. As these bars 50 are not welded to or through the fabric, the water may then flow laterally above the bars 50 and then longitudinally between the bars 47 of each set.

In a modification of the fourth embodiment (not shown), instead of the assembly being made by welding, glue is disposed either within the grooves 35 or on the tapered surfaces of bars 47 and 48 to stick the deformed regions 45 of fabric.

In a fourth embodiment (FIG. 19), a soil support has a rectangular fabric support structure 54 and a secondary support structure 55 which are, respectively, of similar construction to the structures 29 and 46 of the third embodiment and the same reference numerals will be used for like parts.

The structures 54 and 55 differ from their counterparts in the third embodiment, however, in that certain of the subsidiary lateral bars 56 of structure 55 and lateral support members 57 of structure 54 are wider than the bars 49 and support members 37 described above. These wider bars and members 56 and 57 are superposed one above the other in the assembly and are of sufficient width to accommodate rivets 58 passing through them and through the fabric to hold the assembly together. The rivets form a mechanical locking means for the assembly. In the assembly, no welding or glueing is necessary to hold the deformed regions 45 of fabric in place between the support members 33 and bars 47 as the deformed regions are held tightly gripped between these elements.

The construction of the fourth embodiment, while ensuring there is tension in the fabric layer extending between support members 33, does not prevent the flow of water through the deformed regions as the interstices in these regions are not blocked. The fifth embodiment does not control the flow of water through the fabric, therefore, as in the previous embodiments.

What is claimed is:

1. A soil support for a plant container having a rigid fabric support structure comprising a plurality of fabric support members defining openings between them and a layer of substantially inextensible water-permeable fabric extending across the openings in planar manner, at least two spaced apart regions of the fabric being held in a condition deformed from the plane of the fabric by at least two of the spaced-apart support members, one region to each member, to hold the planar fabric in tension between the deformed regions, and said at least two support members extending outwardly beyond the plane of the fabric to provide rigidity against deflection from said plane to support the weight of soil within a container.

2. A soil support according to claim 1 wherein each of the at least two support members is a primary support member having non-planar surface parts, each primary support member is provided with a secondary support member which has surface parts which are substantially complementary to the non-planar surface parts of its primary support member, each deformed region of the fabric is held between the complementary non-planar surface parts of a primary and secondary support members, and mechanical locking means is provided which clamps the primary and secondary support members together with the deformed region of fabric between them.

3. A soil support according to claim 1 wherein said at least two support members have non-planar surface parts and extend outwardly from the non-planar surface parts in extending beyond the plane of the fabric and the deformed regions of fabric are welded to the non-planar surface parts.

4. A soil support according to claim 1 wherein said at least two support members have non-planar surface parts and extend outwardly from the non-planar surface parts in extending beyond the plane of the fabric, and the deformed regions of fabric are held to the non-planar surface parts by adhesive.

5. A soil support according to claim 4 wherein each of the at least two support members is a primary support member provided with a secondary support member which is provided with surface parts which are substantially complementary to the non-planar surface parts of its primary support member, and each deformed region of the fabric is held by the adhesive between the complementary non-planar surface parts of a primary and secondary support members.

6. A soil support for a plant container having a rigid fabric support structure comprising a plurality of fabric support members formed from thermoplastics material, the support members defining openings between them, and a layer of substantially inextensible water-permeable fabric extending across the openings in planar manner, at least two spaced-apart regions of the fabric being held in a condition deformed from the plane of the fabric by being at least partly embedded within the thermoplastic material of at least two of the support members, one region to each member, to hold the planar fabric in tension between the deformed regions, and said at least two support members extending outwardly beyond the plane of the fabric to provide rigidity against deflection from said plane to support the weight of soil within a container.

* * * * *